(12) United States Patent
Dureau et al.

(10) Patent No.: US 10,231,022 B2
(45) Date of Patent: Mar. 12, 2019

(54) METHODS, SYSTEMS, AND MEDIA FOR PRESENTING MEDIA CONTENT USING INTEGRATED CONTENT SOURCES

(71) Applicant: Google LLC, Mountain View, CA (US)

(72) Inventors: Vincent Dureau, San Francisco, CA (US); Majd Bakar, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 14/316,493

(22) Filed: Jun. 26, 2014

(65) Prior Publication Data

US 2015/0007236 A1 Jan. 1, 2015

Related U.S. Application Data

(60) Provisional application No. 61/839,718, filed on Jun. 26, 2013.

(51) Int. Cl.
| | |
|---|---|
| *H04N 21/472* | (2011.01) |
| *H04N 21/431* | (2011.01) |
| *H04N 21/4363* | (2011.01) |
| *H04N 21/41* | (2011.01) |
| *H04N 21/436* | (2011.01) |
| *H04N 5/445* | (2011.01) |

(52) U.S. Cl.
CPC ... *H04N 21/47217* (2013.01); *H04N 5/44513* (2013.01); *H04N 21/4135* (2013.01); *H04N 21/4316* (2013.01); *H04N 21/43615* (2013.01); *H04N 21/43635* (2013.01); *H04N 2005/44534* (2013.01)

(58) Field of Classification Search
None
See application file for complete search history.

(56) References Cited

U.S. PATENT DOCUMENTS

2003/0192057 A1* 10/2003 Gaughan et al. ............. 725/110
2006/0098030 A1*  5/2006 Wang .................... G09G 5/363
345/629

(Continued)

FOREIGN PATENT DOCUMENTS

| EP | 2485485 | 8/2012 |
| JP | 2010102053 | 6/2010 |
| JP | 2013081021 | 5/2013 |

OTHER PUBLICATIONS

International Search Report and Written Opinion dated Oct. 10, 2014 in International Patent Application No. PCT/US2014/044409.

(Continued)

*Primary Examiner* — Michael R Telan
(74) *Attorney, Agent, or Firm* — Byrne Poh LLP

(57) ABSTRACT

Methods, systems, and media for presenting media content using integrated content sources are provided. In some implementations, systems for presenting media content using integrated content sources are provided, the systems comprising: at least one hardware processor that is configured to: receive a control signal corresponding to a user input; generate at least one tuning instruction based on the control signal; transmit the tuning instruction to a tuner; and transmit graphical content and a set of instructions to the display device, wherein the set of instructions contains information about overlaying the graphical content on video content generated based on the tuning instruction.

18 Claims, 4 Drawing Sheets

(56) References Cited

U.S. PATENT DOCUMENTS

| | | | |
|---|---|---|---|
| 2007/0260677 A1* | 11/2007 | DeMarco | H04N 21/4825 709/203 |
| 2010/0205648 A1* | 8/2010 | Saadat et al. | 725/153 |
| 2011/0043326 A1 | 2/2011 | Lee et al. | |
| 2012/0066715 A1 | 3/2012 | Jain et al. | |
| 2012/0079532 A1 | 3/2012 | Wong et al. | |
| 2012/0079551 A1 | 3/2012 | Isozaki et al. | |
| 2012/0092305 A1* | 4/2012 | Barnes | G09G 5/391 345/204 |
| 2013/0007813 A1* | 1/2013 | Baskaran et al. | 725/56 |
| 2013/0038793 A1 | 2/2013 | Yoshida et al. | |

OTHER PUBLICATIONS

Office Action dated May 31, 2017 in EP Patent Application No. 14744227.1.
Summons to Attend Oral Proceedings and Communication dated Jul. 26, 2018 in EP Patent Application No. 14744227.1.
Office Action dated Apr. 3, 2018 in CN Patent Application No. 201480036648.2.

* cited by examiner

METHODS, SYSTEMS, AND MEDIA FOR PRESENTING MEDIA CONTENT USING INTEGRATED CONTENT SOURCES

CROSS-REFERENCE TO RELATED APPLICATION

This application claims the benefit of U.S. Provisional Patent Application No. 61/839,718, filed Jun. 26, 2013, which is hereby incorporated by reference herein in its entirety.

TECHNICAL FIELD

The disclosed subject matter relates to methods, systems, and media for presenting media content using integrated content sources. More particularly, the disclosed subject matter relates to presenting media content using a streaming media device that can control a display device, a tuner/recording device, and/or a recording device.

BACKGROUND

Streaming media devices can provide a user with media content. For example, a streaming media device can stream or download media content through the Internet and cause the streamed or downloaded media content to be rendered. In a more particular example, the streaming media device can stream or download encoded video content through the Internet. The streaming media device can then decode the encoded video content and transmit the decoded video content to a display device that is capable of displaying the decoded video content. However, conventional streaming media devices generally do not include a tuner or a recording device. As such, these streaming devices cannot provide a user with tuned video content, such as live television programs, recorded programs, and on-demand programs. This can, for example, create a disjointed experience for the user, where the user streams media content from the streaming media device and then turns to a television device to watch a live, recorded, or on-demand television program.

Accordingly, it is desirable to provide new mechanisms for presenting media content using integrated content sources.

SUMMARY

Methods, systems, and media for presenting media content using integrated content sources are provided. In accordance with some implementations of the disclosed subject matter, a system for presenting media content using integrated content sources is provided, the system comprising: at least one hardware processor that is configured to: receive a control signal corresponding to a user input; generate at least one tuning instruction based on the control signal; transmit the tuning instruction to a tuner; and transmit graphical content and a set of instructions to a display device, wherein the set of instructions contains information about overlaying the graphical content on video content generated based on the tuning instruction.

In accordance with some implementations, the hardware processor is further configured to generate a record instruction based on the control signal; and transmit the record instruction to a recording device; wherein the set of instructions contains information about overlaying the graphical content on recorded video content generated based on the record instruction.

In accordance with some implementations, the hardware processor is further configured to generate a playback instruction for playing on-demand content based on the control signal; and transmit the playback instruction to a recording device; wherein the set of instructions contains information about overlaying the graphical content on the on-demand content.

In accordance with some implementations of the disclosed subject matter, a method for presenting media content using integrated content sources is provided, the method comprising: receiving a control signal corresponding to a user input; generating, using at least one hardware processor, at least one tuning instruction based on the control signal; transmitting the tuning instruction to a tuner; and transmitting graphical content and a set of instructions to the display device, wherein the set of instructions contains information about overlaying the graphical content on video content generated based on the tuning instruction.

In accordance with some implementations of the disclosed subject matter, a non-transitory computer-readable medium containing computer-executable instructions that, when executed by a processor, cause the process to perform a method for presenting media content using integrated content sources is provided, the method comprising: receiving a control signal corresponding to a user input; generating at least one tuning instruction based on the control signal; transmitting the tuning instruction to a tuner; and transmitting graphical content and a set of instructions to the display device, wherein the set of instructions contains information about overlaying the graphical content on video content generated based on the tuning instruction.

In accordance with some implementations of, a system for presenting media content using integrated content sources is provided, the system comprising: means for receiving a control signal corresponding to a user input; means for generating at least one tuning instruction based on the control signal; means for transmitting the tuning instruction to a tuner; and means for transmitting graphical content and a set of instructions to a display device, wherein the set of instructions contains information about overlaying the graphical content on video content generated based on the tuning instruction.

In accordance with some implementations, the control signal is transmitted from a remote control associated with the system for controlling the display device In accordance with some implementations, the system further comprises means for generating a record instruction based on the control signal; and means for transmitting the record instruction to a recording device; wherein the set of instructions contains information about overlaying the graphical content on recorded video content generated based on the record instruction.

In accordance with some implementations, system further comprises means for generating a playback instruction for playing on-demand content based on the control signal; and means for transmitting the playback instruction to a recording device; wherein the set of instructions contains information about overlaying the graphical content on the on-demand content.

In accordance with some implementations, the tuner is part of the display device.

In accordance with some implementations, the recording device is part of the display device.

In accordance with some implementations, the turner is external to the display device.

In accordance with some implementations, the recording device is external to the display device.

In accordance with some implementations, the system further comprises means for generating a playback instruction for playing a recorded program based on the control signal; and means for transmitting the playback instruction to at least one of a tuner device and a recording device; wherein the set of instructions contains information about overlaying the graphical content on the recorded program.

BRIEF DESCRIPTION OF THE DRAWINGS

Various objects, features, and advantages of the disclosed subject matter can be more fully appreciated with reference to the following detailed description of the disclosed subject matter when considered in connection with the following drawing, in which like reference numerals identify the like elements.

DETAILED DESCRIPTION

Figure 1:
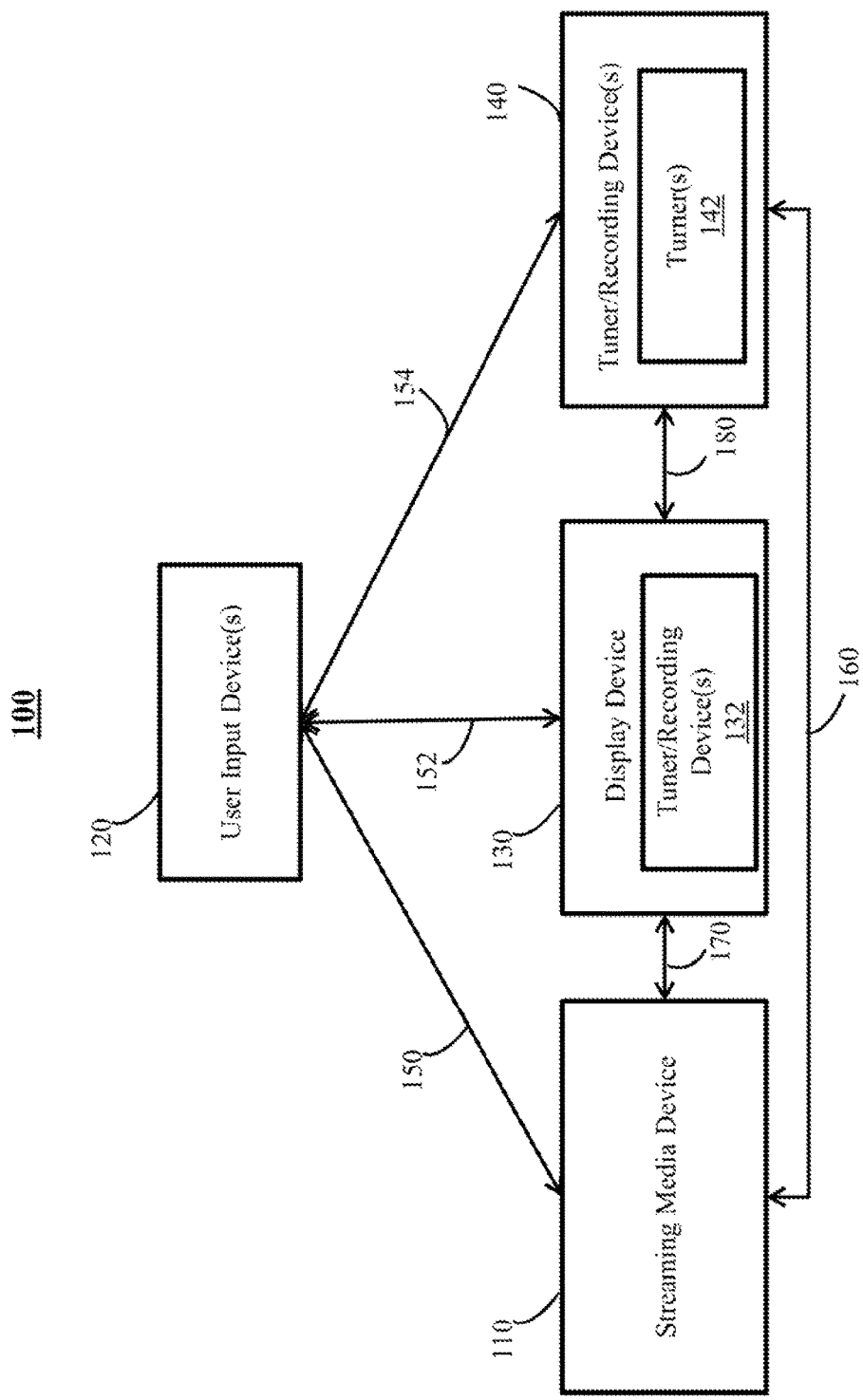
FIG. 1 is a block diagram of an illustrative system for presenting media content using integrated content sources in accordance with some implementations of the disclosed subject matter.

In accordance with some implementations, as described in more detail below, mechanisms, including methods, systems, computer readable media, etc., for presenting media content using integrated content sources are provided.

In some implementations, the mechanisms can be implemented using a streaming media device, a display device, a tuner/recording device, one or more user input devices, and/or any other suitable devices. In some implementations, each of the streaming media device, the display device, and the tuner/recording device can be an HDMI-enabled device that can communicate with other HDMI-enabled devices through one or more HDMI links. In some implementations, an HDMI link can include multiple communication channels. For example, the HDMI link can include one or more Transition Minimized Differential Signaling (TMDS) channels that can be used to transmit audio data, video data, auxiliary data, and/or other suitable data. As another example, the HDMI link can also include a Consumer Electronics Control (CEC) channel that can be used to provide multiple CEC-enabled devices with various control functions. In a more particular example, a CEC-enabled device can control another CEC-enabled device by sending and/or receiving messages that comply with the HDMI CEC standard via a CEC line.

In some implementations, the streaming media device can provide the display device with suitable media content. For example, the streaming media device can download and/or stream encoded media content (e.g., encoded video data, encoded audio data, etc.) through a suitable network (e.g., the Internet, etc.). The streaming media device can then decode the encoded media content and cause the decoded media content to be rendered, for example, on an associated display device. As another example, the streaming media device can form composite video content based on suitable video content and graphical overlays (e.g., by superimposing the graphical overlays on the video content). The streaming media device can then transmit the composite video content to the display device through a suitable communication link (e.g., an HDMI link, etc.).

In some implementations, while providing media content to the display device, the streaming media device can receive one or more control signals relating to one or more tuning functionalities that can be performed by a tuner. Examples of the control signals can include an infrared signal (IR), a WiFi signal, and/or other suitable signals that correspond to one or more user inputs, such as the user pressing and/or releasing a button on the user input device, the user inputting suitable information using a user interface displayed on the user input device, etc.

In some implementations, the control signal can be transmitted from a user input device that is paired or otherwise coupled to the streaming media device. For example, the user input device can receive one or more user inputs (e.g., the user pressing and/or releasing a button on the user input device, the user inputting suitable information using a user interface displayed on the user input device, etc.). The user input device can then generate one or more control signals based on the user inputs and transmit the control signals to the streaming media device through a suitable communication link (e.g., an infrared (IR) link, a WiFi link, a radio frequency (RF) link, etc.).

In some implementations, the control signals can be transmitted from a device (e.g., a television) that is capable of transmitting such control signals. In a more particular example, the device can receive a control signal (e.g., an IR signal or a WiFi signal corresponding to the user pressing and/or releasing a channel-up button on a remote control) from a user input device that is paired or otherwise connected to the device. The device can then pass the received control signal to the streaming device. Alternatively or additionally, the device can convert the control signal into one or more instructions (e.g., HDMI CEC commands) and transmit the instructions to the streaming media device through a suitable communication link (e.g., an HDMI CEC link).

In some implementations, for example, the streaming media device may not include a built-in tuner that can perform tuning functionalities based on the received control signals. In such an example, in response to receiving the control signals, the streaming media device can instruct an external tuner to perform the tuning functionalities. For example, the streaming media device can generate a set of tuning instructions based on the control signals and instruct a tuner to execute the instructions. In some implementations, for example, the streaming media device may not include a built-in recorder that can perform recording and/or playback functionalities (e.g., recording a program, playing a recorded program, etc.) based on the received control signals. In such an example, in response to receiving the control signals, the streaming media device can generate a set of instructions to instruct an external recording device to perform the recording functionalities and/or to playback recorded programs.

In a more particular example, in response to receiving one or more control signals indicating the user pressing and/or releasing a particular button of the user device (e.g., a channel-up button, a channel-down button, a channel number button, a record button, a play button, etc.), the streaming media device can convert the control signals into one or more HDMI CEC instructions indicating that the particular button has been pressed or released by the user (e.g., a "user control pressed" instruction, a "user control released instruction," etc.).

In another more particular example, in response to receiving one or more control signals corresponding to the user selecting a particular television channel that should be tuned to (e.g., by selecting a channel-up button, a channel-down button, a channel button, etc. using a user input device), the streaming media device can convert the control signals into one or more HDMI CEC instructions that can instruct a tuner to tune to the particular television channel (e.g., a "tuner step increment" instruction, a "tuner step decrement" instruction, a "record" instruction, a "playback" instruction, and/or any other suitable instructions).

In some implementations, the streaming media device can transmit the instructions to perform tuning functionalities, recording functionalities, and/or playback functionalities to a tuner/recording device. For example, the streaming media device can transmit the instructions to a display device. The display device can then generate video content using a tuner and/or a recording device that is integrated with or coupled to the display device based on the instructions. As another example, the streaming media device can transmit the instructions to a tuner/recording device. The tuner/recording device can then generate video content using a built-in tuner and/or a built-in recording device based on the tuning instructions. As yet another example, the streaming media device can transmit the instructions to the display device that may not include a built-in tuner and/or a built-in recording device. The display device can then transmit the instructions to the tuner/recording device that is capable of executing the tuning instructions.

In some implementations, the display device can obtain suitable video content and graphical content from difference sources and combine the video content and the graphical content into composite video content. In some implementations, the video content can be obtained from a suitable source (e.g., the tuner/recording device, the streaming media device, on-demand streaming media providers, television service providers, recorded programs, etc.). For example, as described above, the display device can obtain video content (e.g., live television programs, recorded programs, on-demand programs, etc.) based a set of instructions transmitted from the streaming media device. In a more particular example, the display device can instruct a tuner integrated with or coupled to the display device to generate suitable video content based on the instructions (e.g., a set of HDMI CEC instructions). In another more particular example, the display device can instruct a recording device integrated with or coupled to the display device to record a program, play a recorded program, and/or perform any other suitable recording and/or playback functionalities.

As another example, the display device can receive video content from a tuner/recording device. In a more particular example, the tuner/recording device can generate the video content based on a set of instructions transmitted from the streaming media device (e.g., a "tuner step increment" instruction, a "tuner step decrement" instruction, a "record" instruction, a "playback" instruction, etc.). The tuner/recording device can then transmit the video content to the display device through a suitable communication link, such as an HDMI link.

In some implementations, the streaming media device can transmit to the display device graphical content that can be rendered with suitable video content in the form of graphical overlays, such as on-screen displays, electronic program guides, user interfaces for setting a tuner/recording device, user interfaces for scheduling, editing, and/or deleting a recording using a recording device, video-on-demand (VOD) catalogs, DVR etc. The streaming media device can also transmit a set of instructions relating to rendering the graphical content to the display device. In some implementations, the set of instructions can include any suitable information relating to forming graphical overlays based on the graphical content and rendering the graphical overlays. For example, the set of instructions can include encoding and/or decoding parameters that can be used to reconstruct image data, such as encoding modes, reference frames, motion vectors, etc. As another example, the set of instructions can include parameters about the location, shape, and/or size of a region of a screen in which the graphical overlays can be displayed. As yet another example, the set of instructions can include one or more parameters that can be used to form the composite video content based on the video content and the graphical overlays, such as one or more alpha values, a set of colors that can be used to generate the composite video content, etc.

In some implementations, the display device can form graphical overlays based on the graphical content and the set of instructions transmitted from the streaming device. The display device can then combine the graphical overlays and the video content into composite video content based on the set of instructions. For example, the display device can change the color and/or transparency of the video content and/or the graphical overlays based on the alpha values contained in the set of instructions. The display device can then superimpose the graphical overlays on the video content based on a suitable algorithm, such as an alpha algorithm.

These and other features for presenting media content using integrated content sources are described herein in connection with FIGS. 1-4.

Turning to FIG. 1, an example 100 of a system for presenting media content using integrated content sources is provided in accordance with some implementations of the disclosed matter. As shown, system 100 can include a streaming media device 110, one or more user input device(s) 120, a display device 130, and a tuner/recording device 140.

Streaming media device 110 can be any suitable device that is capable of receiving, processing, converting, and/or transmitting media content, and/or performing any other suitable functions. Examples of streaming media devices include a streaming media player, a media center computer, a DVD recorder, a BLU-RAY player, a digital video recorder, a television device, a tablet computing device, a laptop, a desktop, a mobile phone, a game console, etc.

User input device(s) 120 can be any suitable device that is capable of receiving and/or processing user inputs, generating and transmitting control signals based on the received user inputs, and/or performing any other suitable functions. For example, user input device(s) 120 can include a remote control, a mobile phone, a tablet computer, a laptop computer, a desktop computer, a personal data assistant (PDA), a portable email device, a game console, a voice recognition system, a gesture recognition system, a keyboard, a mouse, etc. In some implementations, user input device(s) 120 can receive any suitable user inputs. For example, the user inputs can include one or more inputs entered by a user corresponding to one or more functions that can be performed by one or more of streaming media device 110, display device 130, tuner/recording device 140, and/or any other suitable components of system 100. In a more particular example, the user inputs can include the user pressing and/or releasing one or more buttons of a remote control. In another more particular example, the user inputs can include the user selecting one or more suitable buttons on a user interface displayed on user input device(s) 120.

Display device 130 can be any suitable device that is capable of receiving, converting, processing, and/or presenting media content, such as a streaming media player, a media center computer, a CRT display, a LCD, a LED display, a plasma display, a touch-screen display, a simulated touch screen, a television device, a tablet user input device, a mobile phone, etc. In some implementations, display device 130 can present the user with three-dimensional content.

Tuner/recording device 140 can be any suitable device that is capable of receiving, converting, processing, recording, and/or presenting media content, and/or performing any other suitable functions, such as a set-top box, a DVD recorder, a digital video recorder, a television, a computer, a mobile phone, etc.

In some implementations, as shown in FIG. 1, each of display device 130 and tuner/recording device 140 can include one or more suitable tuners, such as a terrestrial tuner, a satellite tuner, a cable tuner, an IP tuner, etc. In some implementations, the tuner(s) can be integrated with display device 130 and/or tuner/recording device 140. Alternatively, the tuner(s) can be external tuners that can be coupled to display device 130 and/or tuner/recording device 140 in a suitable manner.

In some implementations, each of streaming media device 110, user input device(s) 120, display device 130, and tuner/recording device(s) 140 can be any of a general purpose device, such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, a storage device (which can include a hard drive, a digital video recorder, a solid state storage device, a removable storage device, or any other suitable storage device), etc.

In some implementations, each of streaming media device 110, display device 130, and tuner/recording device 140 can be connected to user input device(s) 120 through communication links 150, 152, and 154, respectively. In some implementations, streaming media device 110 can be connected to tuner/recording device 140 and display device 130 through communication links 160 and 170, respectively. In some implementations, display device 130 can be connected to tuner/recording device(s) 140 through communication link 180. Communication links 150, 152, 154, 160, 170, and 180 can be any suitable communication links, such as network links, dial-up links, wireless links, hard-wired links, any other suitable communication links, or a combination of such links. In some implementations, each of communication links 150, 152, 154, 160, 170, and 180 can include one or more infrared (IR) communication links, High-Definition Multimedia Interface (HDMI) links, local area network (LAN) links, etc.

In some implementations, each of streaming media device 110, user input device(s) 120, display device 130, and tuner/recording device 140 can be an HDMI-enabled device that can communicate with other HDMI-enabled devices through one or more HDMI links. In some implementations, an HDMI link can include multiple communication channels. For example, the HDMI link can include one or more Transition Minimized Differential Signaling (TMDS) channels that can be used to transmit audio data, video data, auxiliary data, and/or other suitable data. As another example, the HDMI link can also include a Consumer Electronics Control (CEC) channel that can be used to provide multiple CEC-enabled devices with various control functions. In a more particular example, a CEC-enabled device can control another CEC-enabled device by sending and/or receiving messages that comply with the HDMI CEC standard via a CEC line.

In some implementations, an HDMI-enabled device can identify other devices of system 100 and communicate with a particular device that has been identified. For example, the HDMI-enabled device can identify devices that are connected to the HDMI-enabled device through a physical address discovery process. In a more particular example, the HDMI-enabled device can generate its own physical address (e.g., 0.0.0.0) and allocate a physical address to each device that is connected to the HDMI-enabled device (e.g., by appending a port number onto its own physical address). In some implementations, the HDMI-enabled device can store the physical addresses associated with the connected devices and send messages to a particular physical address through an HDMI link. As another example, an HDMI-enabled device can also identify devices that are connected to the HDMI-enabled device through a logical address allocation process. More particularly, for example, upon detecting a connected device, the HDMI-enabled device can identify the type of the connected device (e.g., a display device, a tuner/recording device, a streaming media device, etc.) and allocate a logical address to the connected device. In some implementations, the logical address can define the type of the connected device and serve as an identifier of the connected device. In some implementations, messages can be addressed to a particular logical address of an HDMI-enabled device through a CEC link.

Each of streaming media device 110, user input device(s) 120, display device 130, and tuner/recording device(s) 140 can be implemented as a stand-alone device or integrated with other components of system 100.

Figure 2:
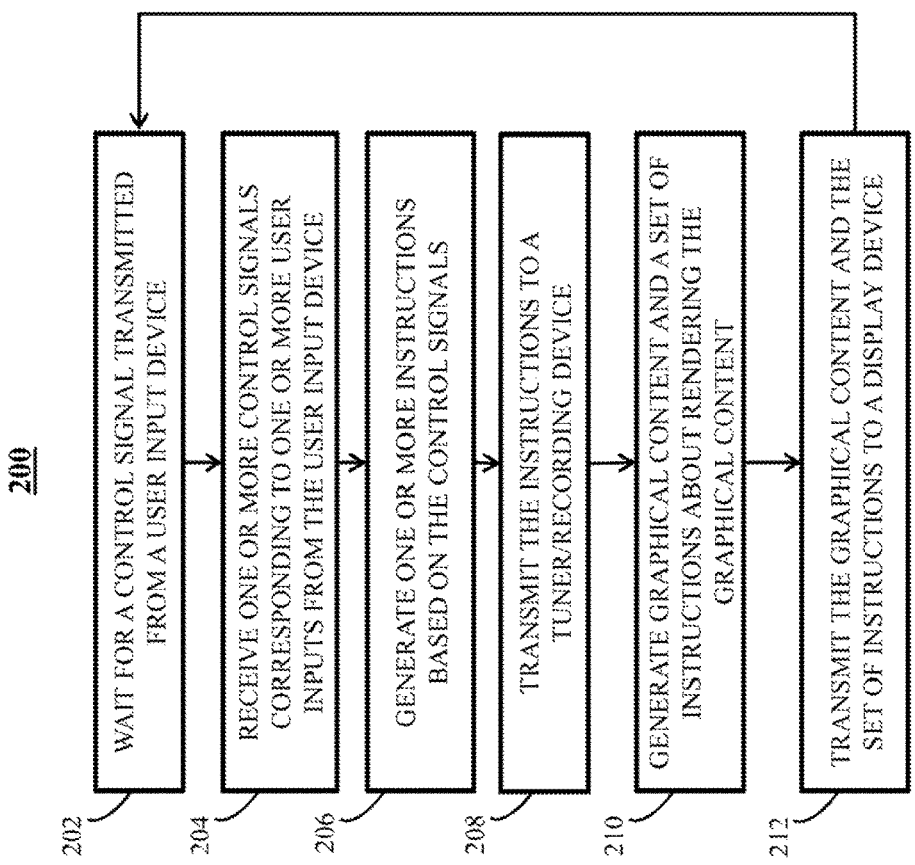
FIG. 2 is a flow chart of an illustrative process for controlling a display device to present media content in accordance with some implementations of the disclosed subject matter.

Turning to FIG. 2, an example 200 of a process for controlling a display device to present media content using integrated content sources in accordance with some implementations of the disclosed subject matter is shown. In some implementations, process 200 can be implemented in a suitable streaming media device (e.g., streaming media device 110 of FIG. 1).

As shown, process 200 can begin by waiting to receive a control signal transmitted from a user input device at 202. For example, process 200 can determine whether a control signal has been received at a suitable receiver. In a more particular example, process 200 can determine whether a receiver of the streaming media device (e.g., an IR receiver, an HDMI receiver, etc.) has received a control signal transmitted from a user input device (e.g., a remote control, a mobile phone, etc.).

While waiting to receive a control signal, process 200 may provide a display device with suitable media content. For example, the streaming media device can download encoded media content (e.g., encoded video data, encoded audio data, etc.) through a suitable network (e.g., the Internet, etc.). The streaming media device can then decode the encoded media content and cause the decoded media content to be rendered. As another example, the streaming media device can generate composite video content based on suitable video content and graphical overlays (e.g., by superimposing the graphical overlays on the video content). The streaming media device can then transmit the composite video content to the display device through a suitable communication link (e.g., an HDMI link, etc.).

At 204, process 200 can receive one or more control signals transmitted from the user input device. Any suitable control signals can be received in some implementations. For example, the control signals can correspond to one or more user inputs received by the user input device (e.g., a user pressing and/or releasing a button on a remote control, selecting a portion of a user interface displayed on a user input device, etc.). In some implementations, the user inputs can indicate one or more functions that can be performed by one or more of the streaming media device, the display device, the tuner/recording device, and/or any other suitable devices. In a more particular example, the control signals can correspond to one or more user inputs that can indicate a television channel that a user has selected to watch. In some implementations, the user inputs can include an input that can indicate the number of the television channel (e.g., the user selecting a button corresponding to the number using a user input device). In some implementations, the user inputs can include an input indicating that the user has selected to switch from a current television channel that is being displayed to a next available channel (e.g., the user selecting a channel-up button or channel-down button using a user input device).

In another more particular example, the control signals can correspond to one or more user inputs indicative of a user request to record one or more portions of a program (e.g., a user selection of a "record" button using a user input device). In yet another more particular example, the control signals can correspond to one or more user inputs indicative of a user request to playback a recorded program (e.g., a user selection of a "play" button using a user input device).

In still another more particular example, the control signals can correspond to one or more user inputs that can indicate that one or more of the streaming media device, the display device, the tuner/recording device, etc., should be turned on or off. In some implementations, the control signals can cause one or more of these devices to power on or off. In some implementations, a control signal can be generated by the user input device in response to the user selecting a particular button (e.g., a "play" button) using the user input device. The user input device can then transmit the control signal to the streaming media device. In response to receiving the control signal, the streaming media device can automatically power on and switch to a suitable media content input (e.g., an HDMI input). In some implementations, the streaming media device can also transmit the control signal to one or more other devices (e.g., the display device, the tuner/recording device, etc.) and cause those devices to power on and switch to a suitable input channel (e.g., an HDMI input) based on the control signal.

In some implementations, the control signals can be received in any suitable manner. For example, the control signals can be transmitted from the user input device through a suitable communication link, such as an infrared (IR) and/or radio frequency communication link, an HDMI CEC link, an HDMI High-Speed Data link, a local-area network (LAN) communication link, etc.

At 206, process 200 can generate one or more instructions based on the received control signals. The instructions can include any suitable information that can be used to that can instruct one or more tuners and/or recording devices to perform suitable tuning functionalities, recording functionalities, playback functionalities, etc. For example, the instructions can include information about the identifications of one or more devices that are capable of receiving, processing and/or executing tuning functionalities, recording functionalities, playback functionalities, etc. In a more particular example, the instructions can include the addresses and/or descriptions associated with the devices. In some implementations, the instructions can also include information that can identify a default device (e.g., addresses, descriptions, etc. of the default device) to execute the instructions in the case where multiple devices are available to receive, process, and/or execute the instructions.

As another example, the instructions can include information about one or more particular types of tuners and/or recording devices that can perform the instructions. In a more particular example, the instructions can include information that can indicate that one or more of the instructions can be processed and/or executed by one or more of a cable tuner, a satellite tuner, a terrestrial tuner, an IP tuner, etc.

As yet another example, the instructions can include one or more instructions that can define one or more channels to which a tuner can tune. In a more particular example, the instructions can include an instruction that can instruct the tuner to tune to one or more particular frequencies, one or more combinations of a network ID, a transport stream ID, and a service ID, and/or any other suitable identifiers of one or more channels. In another more particular example, the instructions can include an instruction that can instruct the tuner to tune to a channel associated with a particular channel number and/or channel call sign. In yet another more particular example, the instructions can include a channel-up instruction and/or a channel-down instruction that can instruct the tuner to switch from a current channel to a next available channel.

As still another example, the instructions can include information that can be used to record a program, such as information that can identify the program, information that can identify a source that provides the program, timing information related to the recording (e.g., a start time of the recording, an end time of the recording, a duration of the recording, etc.), and/or any other suitable information.

In accordance with some implementations, the instructions can be generated in any suitable manner. For example, in response to receiving one or more control signals (e.g., IR signals transmitted from the user input device) indicating information about a particular channel that a user has selected to watch, process 200 can process the control signal and generate one or more instructions that can instruct a suitable tuner to tune to that particular channel. In a more particular example, in response to receiving one or more control signals indicating the user pressing and/or releasing a particular button of the user input device (e.g., a record button, a play button, a channel-up button, a channel-down button, a channel number button, etc.), process 200 can convert the control signals into one or more HDMI CEC instructions indicating that the particular button has been pressed or released by the user (e.g., a "user control pressed" instruction, a "user control released" instruction, etc.). In another more particular example, in response to receiving one or more control signals indicating the user's desire to switch to a next available channel (e.g., by selecting a channel-up button or a channel-down button of a remote control or a user interface displayed on a user input device), process 200 can convert the control signals into one or more HDMI CEC instructions indicating that a tuner should tune to the next available channel (e.g., a "tuner step increment" instruction, a "tuner step decrement" instruction, etc.).

As another example, upon receiving the control signals, process 200 can use the control signals as a set of instructions. In a more particular example, in response to receiving one or more control signals (e.g., IR signals, HDMI CEC signals, etc.) that include information about a particular channel that a user has selected to watch, process 200 can transmit the received control signals as a set of tuning instructions, playback instructions, recording instructions, etc. to a device that is capable of processing the control signals.

Next, at 208, process 200 can transmit the instructions to a tuner/recording device. The tuner/recording device can be any suitable device that is capable of performing tuning functions, recording functions, playback functions, and/or any other suitable functions based on one or more of the instructions. For example, the tuner/recording device can be integrated with or coupled to a display device (e.g., display device 120 of FIG. 1). As another example, the tuner/recording device can be a tuner/recording device 130 as described above in connection with FIG. 1.

In some implementations, the instructions can be transmitted to the tuner in any suitable manner. For example, the streaming media device can transmit the instructions to the tuner/recording device through a suitable communication link (e.g., an HDMI CEC link, an IR or RF link, a LAN communication link, etc.). As another example, the instructions can be transmitted to the tuner/recording device through a device that is capable of transmitting the instructions. In a more particular example, the instructions can be transmitted from the streaming media device to the display device. The display device can then transmit the instructions to the tuner/recording device.

At 210, process 200 can generate graphical content that can be used to form one or more graphical overlays. The graphical content can contain any suitable data and/or information that can be used to form one or more graphical overlays (e.g., on-screen displays, electronic program guides, user interfaces for setting a tuner/recording device, user interfaces for scheduling, editing, and/or deleting a recording using a recording device, video-on-demand (VOD) catalogs, DVR etc.) that can be displayed with suitable video content on a screen. For example, the graphical content can include any suitable combination of text, still images, moving images, sound, etc. In a more particular example, the graphical content can include one or more uncompressed still images and/or moving images having suitable sizes and/or resolutions. In some embodiments, each of the images can include a given number of pixels (e.g., having a given number of rows and a given number of columns of pixels).

In another more particular example, the graphical content can include compressed image data that can be used to reconstruct one or more still images and/or moving images. In some implementations, the compressed image data can be generated based on a suitable lossy or lossless compression protocol. In some implementations, the compressed image data can include one or more encoded images and suitable information that can be used to reconstruct uncompressed still and/or images (e.g., motion vectors, encoding modes, reference frame numbers, etc.).

In yet another more particular example, the graphical content can include a set of geometric primitives that can be used to form vector graphics. In a more particular example, the geometric primitives can include lines, polylines, polygons, curves, circles, ellipses, color gradient, etc. that can be used to form vector graphics.

At 210, process 200 can generate a set of instructions relating to rendering the graphical content. The set of instructions can contain any suitable information about rendering the graphical content. For example, the set of instructions can include information about forming graphical overlays based on the graphical content. In a more particular example, the set of instructions can include information about the format of the graphical content (e.g., compressed image data, uncompressed image data, text strings, etc.). In another more particular example, the set of instructions can include information that can be used to reconstruct uncompressed still images and/or moving images from one or more compressed images (e.g., encoding modes, reference frames, motion vectors, etc.).

As another example, the set of instructions can include information about the location, shape, and/or size of a region of a screen in which the graphical content can be rendered. In a more particular example, the set of instructions can include one or more coordinate instructions that can define the location and/or size of the region with respect to a screen on which the graphical content will be rendered. In some implementations, the coordinate instructions can include one or more coordinates (e.g., x-coordinates, y-coordinates, z-coordinates, etc.) that can define the start positions, end positions, and/or other suitable parameters of the region in one or more particular dimensions (e.g., x dimension, y dimension, z dimension, etc.). In another more particular example, the set of instructions can include one or more coordinate instructions that can define the location and/or size of the region with respect to a region in which video content can be displayed. In some implementations, the coordinate instructions can include one or more coordinates that can indicate the offsets between the location of the region in which the video content can be rendered and the location of the region in which the graphical content can be rendered. In some implementations, the coordinate instructions can include one or more coordinates that can define an overlapping region in which both of the video content and the graphical content can be rendered.

As yet another example, the set of instructions can include one or more instructions that can instruct the display device to combine the graphical overlays and the video content in a suitable manner. In some implementations, for example, the composite video content can be generated by composing the video content and the graphical overlays with suitable colors and/or transparency based on a suitable blending algorithm, such as an alpha blending algorithm. In such an example, the set of instructions can include one or more alpha values that can indicate the transparency of the video content and/or the graphical overlays and/or information about colors (e.g., R, G, B, etc.) that can be used to generate the composite video content. In some implementations, for example, the graphical overlays can be blended with the video content based on an alpha value of 1. In such an example, the graphical overlays can be fully opaque while the video content can be fully transparent when they are combined into the composite video content. In some implementations, for example, the instructions can include a set of alpha values each of which can correspond to one or more pixels of the graphical overlays to be blended.

At 212, process 200 can transmit the graphical content and the set of instructions about rendering the graphical content to a display device. The graphical content and the set of instructions can be transmitted in any suitable manner. For example, the graphical content can be transmitted to the display device as a video output via a suitable communication link, such as an HDMI link that can connect the streaming media device to the display device. As another example, the graphical content can be transmitted in the form of one or more compact data streams, such as a Hyper Text Markup Language (HTML) Document Object Model (DOM) stream, an HDMI high-speed data stream, etc.

The set of instructions can be transmitted in any suitable manner. For example, the set of instructions can be transmitted to the display device through a suitable communication link, such as an HDMI CEC link, an IR or RF link, a LAN link, etc. In a more particular example, the set of instructions can be transmitted in the form of a set of IR commands, a set of CEC commands, etc.

In some implementations, after performing step 212, process 200 can return back to step 202.

Figure 3:
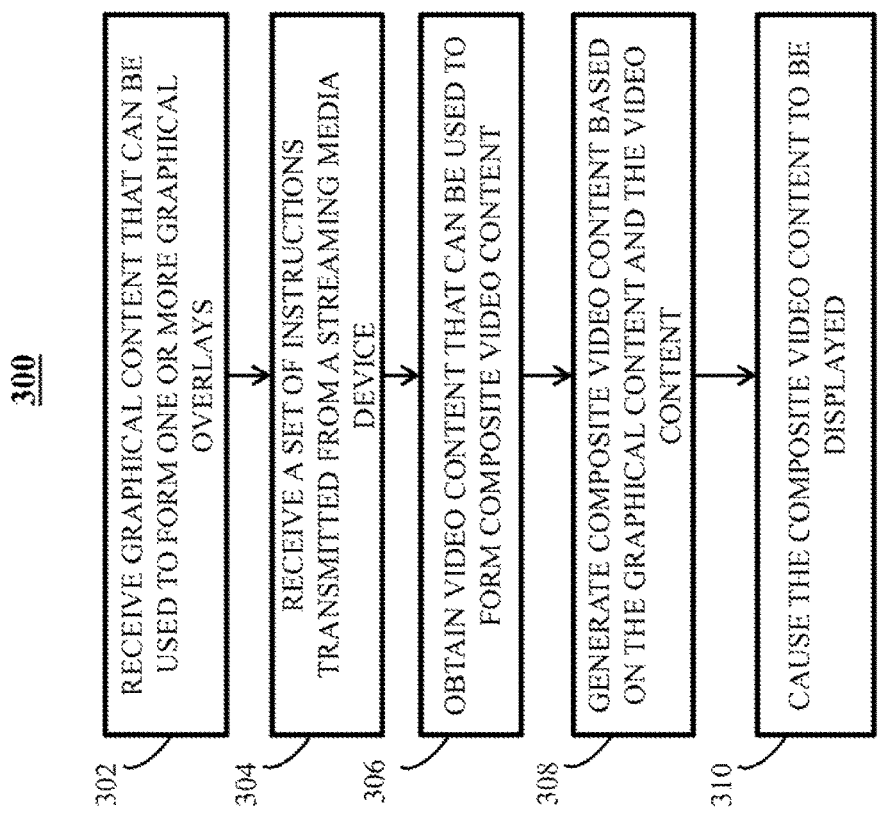
FIG. 3 is a flow chart of an illustrative process for presenting media content using integrated content sources using a display device in accordance with some implementations of the disclosed subject matter.

Turning to FIG. 3, an example 300 of a process for presenting media content using integrated content sources in accordance with some implementations of the disclosed subject matter is shown. In some implementations, process 300 can be implemented in system 100 as illustrated in FIG. 1. In a more particular example, process 300 can be implemented in display device 130 as illustrated in FIG. 1.

As shown, process 300 can begin by receiving graphical content that can be used to form one or more graphical overlays at 302. The graphical content can contain any suitable information and can be received in any suitable manner. In some implementations, for example, the graphical content can be generated by and transmitted from the streaming media device as described above in connection with FIG. 2.

At 304, process 300 can receive a set of instructions from a streaming media device. The set of instructions can include any suitable information. For example, the set of instructions can include one or more tuning instructions, recording instructions, playback instructions, and/or any other suitable instruction generated by the streaming media device. In a more particular example, the instructions can be generated as described above in connection with FIG. 2. As another example, the set of instructions can include one or more instructions relating to rendering the graphical content received at 302. In a more particular example, the instructions relating to rendering the graphical content can be generated and transmitted as described above in connection with FIG. 2.

At 306, process 300 can obtain video content that can be used to form composite video content. The video content can be obtained in any suitable manner. For example, the video content can be received from a suitable video source (e.g., television programs, movies, streaming live content, pay-per-view programs, on-demand programs (e.g., as provided in video-on-demand (VOD) systems), Internet content (e.g., streaming content, downloadable content, Webcasts, etc.)). In a more particular example, the video content can be obtained from the streaming media device.

As another example, the video content can be generated based at least in part on the set of instructions received at 304. More particularly, for example, the video content can be generated based on one or more of the instructions that are received at 304. In a more particular example, the display device can generate the video content based on one or more of the instructions. In some implementations, the display device can instruct one or more suitable tuner/recording devices (e.g., tuner/recording devices that are integrated with or coupled to the display device) to tune to a channel based on one or more of the tuning instructions (e.g., a "tuner step increment" instruction, a "tuner step decrement" instruction, a frequency instruction, etc.), to play a recorded program, to play an on-demand program, and/or to provide video content in any other suitable manner.

Figure 4:
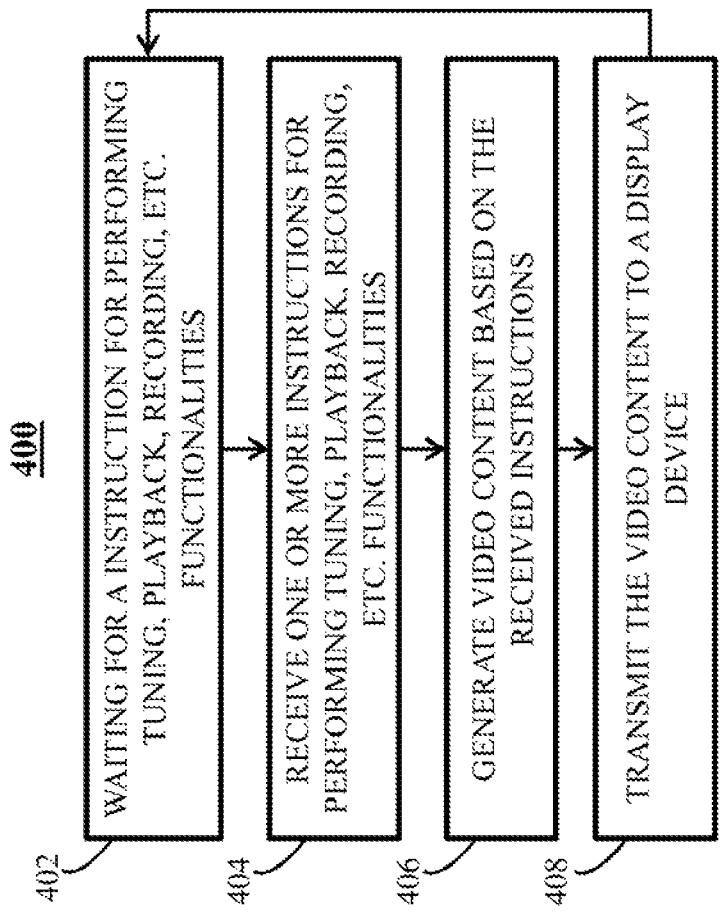
FIG. 4 is a flow chart of an illustrative process for generating video content using a tuner/recording device in accordance with some implementations of the disclosed subject matter.

In some implementations, the video content can be obtained from a tuner/recording device. For example, the tuner/recording device can generate the video content and transmit the video content to the display device. In a more particular example, as illustrated in FIG. 4, the tuner/recording device can generate the video content based on one or more of the instructions (e.g., by tuning to a channel, playing a recorded program, playing on-demand content, and/or generating video content in any other suitable manner).

As shown, process 400 can begin by waiting for an instruction at 402. For example, while waiting, process 400 can determine if one or more instructions have been received by a receiver of the tuner/recording device (e.g., an IR receiver, an HDMI receiver, etc.).

At 404, process 400 can receive one or more instructions for performing tuning functionalities, recording functionalities, and/or playback functionalities. The instructions can be received in any suitable manner. For example, the instructions can be transmitted from a device that generates the instructions. In a more particular example, as described above in connection with FIG. 2, the instructions can be transmitted from the streaming media device. In such an example, the streaming media device can receive one or more control signals corresponding to one or more user inputs, generate one or more instructions based on the control signals, and transmit the instructions to the tuner/recording device.

As another example, the instructions can be transmitted to the tuner/recording device through a device that can receive the instructions from another device. In a more particular example, as discussed above in connection with FIG. 2, the streaming media device can generate one or more instructions and transmit the instructions to the display device. The display device can then transmit the instructions to the tuner/recording device through a suitable communication link.

At 406, process 400 can generate video content based on the instructions. For example, the tuner/recording device can generate the video content using one or more suitable tuners (e.g., tuners that are integrated with or coupled to the tuner/recording device in a suitable manner). In a more particular example, the tuner/recording device can identify a tuner that can execute the tuning instructions (e.g., based on the address, description, and/or other suitable information of the tuner contained in one or more of the tuning instructions). The tuner/recording device can then instruct the identified tuner to tune to a channel based on one or more of the tuning instructions (e.g., a channel number instruction, a channel-up instruction, a channel-down instruction, a frequency instruction, etc.). The tuned video content generated by the identified tuner can then be used as the video content.

As another example, the tuner/recording device can retrieve recorded programs, on-demand programs, Internet content, streaming programs, and/or any other suitable video content based on the instructions.

Next, at 408, process 400 can transmit the video content to the display device. The video content can be transmitted in any suitable manner. For example, the video content can be transmitted from a transmitter of the tuner/recording device to a receiver of the display device through a suitable communication link, such as an HDMI link, a LAN link, etc.

In some implementations, after performing step 408, process 400 can return back to step 402.

Referring back to FIG. 3, at 308, process 300 can generate composite video content based on the graphical content and the video content. The composite video content can be generated in any suitable manner. In some implementations, for example, process 300 can generate one or more graphical overlays (e.g., including one or more still images, moving images, text, user interfaces, etc.) based on one or more instructions received at 304. Process 300 can then combine the graphical overlays with the video content in a suitable manner. In a more particular example, process 300 can extract uncompressed image data (e.g., one or more uncompressed still images and/or moving images) from the received graphical content and use the uncompressed image data as graphical overlays. In another more particular example, process 300 can extract compressed image data (e.g., one or more compressed still images and/or moving images) from the graphical content. Process 300 can then decompress the compressed image data based on the instructions received at 302 (e.g., encoding modes, reference frames, motion vectors, etc.). In yet another more particular example, process 300 can extract a set of geometric primitives (e.g., lines, polylines, polygons, curves, etc.) and generate graphical overlays based on the geometric primitives and the instructions received at 302.

In some implementations, process 300 can combine the video content and the graphical overlays based on one or more of the instructions received at 304. The video content and the graphical overlays can be combined in any suitable manner. For example, process 300 can combine a first image that is included in the video content and a second image that is included in the graphical overlays based on one or more of the instructions. In a more particular example, process 300 can locate an overlapping region in which the first image and the second image can be combined based on one or more of the instructions (e.g., the coordinate instructions that can define the overlapping region). In another more particular example, process 300 can adjust the transparency and/or color of the first image and/or the second image based on one or more of the instructions. More particularly, for example, the transparency and/or color of the first image and the second image can be adjusted based on one or more alpha values provided by the instructions. In some implementations, in such an example, process 300 can then combine the first image and the second image to form a third image (e.g., by superimposing the first image on the second image).

At 310, process 300 can cause the composite video content to be displayed. The composite video content can be displayed in any suitable manner. For example, process 300 can cause the composite video content to be displayed based on one or more instructions received at 304. In a more particular example, process 300 can identify a first region of a screen in which the graphical overlays can be displayed and a second region of the screen in which the video content can be displayed based on one or more of the instructions (e.g., the coordinate instructions described above in connection with FIG. 2). Process 300 can then cause the graphical overlays and the video content to be displayed in the first region and the second region respectively. In another more particular example, process 300 can locate an overlapping region in which both the graphical overlays and the video content can be displayed (e.g., the coordinate instructions described above in connection with FIG. 2). More particularly, for example, process 300 can display composite video content (e.g., based on an alpha blending algorithm) in the identified overlapping region.

It should be understood that the above steps of the flow diagrams of FIGS. 2-4 can be executed or performed in any order or sequence not limited to the order and sequence shown and described in the figure. Also, some of the above steps of the flow diagrams of FIGS. 2-4 can be executed or performed substantially simultaneously where appropriate or in parallel to reduce latency and processing times. Furthermore, it should be noted that FIGS. 2-4 are provided as examples only. At least some of the steps shown in these figures may be performed in a different order than represented, performed concurrently, or altogether omitted.

In some implementations, any suitable computer readable media can be used for storing instructions for performing the processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

The provision of the examples described herein (as well as clauses phrased as "such as," "e.g.," "including," and the like) should not be interpreted as limiting the claimed subject matter to the specific examples; rather, the examples are intended to illustrate only some of many possible aspects.

Accordingly, methods, systems, and media for presenting media content using integrated content sources are provided.

Although the disclosed subject matter has been described and illustrated in the foregoing illustrative implementations, it is understood that the present disclosure has been made only by way of example, and that numerous changes in the details of implementation of the disclosed subject matter can be made without departing from the spirit and scope of the disclosed subject matter, which is limited only by the claims that follow. Features of the disclosed implementations can be combined and rearranged in various ways.

What is claimed is:

1. A system for presenting media content using integrated content sources, comprising:
   at least one hardware processor of a streaming media device that is configured to:
      receive a control signal corresponding to a user input;
      generate at least one tuning instruction based on the control signal;
      generate graphical content;
      transmit the tuning instruction to a display device via an HDMI connection, wherein the display device is to instruct a tuner external to the display device to generate video content based on the tuning instruction, and wherein the display device is to present the video content generated by the tuner and the graphical content;
      generate a set of instructions that instruct the display device to render the graphical content generated by the streaming media device as one or more graphical overlays on the video content generated by the tuner external to the display device based on the tuning instruction, wherein the set of instructions includes one or more coordinates that define an overlapping region in which both the video content and the graphical overlays are rendered and one or more parameters for modifying a transparency of the video content generated by the tuner; and transmit the graphical content, including at least one geometric primitive that can be used to form vector graphics, and the set of instructions from the streaming media device to the display device via the HDMI connection, wherein the graphical content contains data usable to form the one or more graphical overlays at the one or more coordinates based on the set of instructions.

2. The system of claim 1, wherein the control signal is transmitted from a remote control associated with the system for controlling the display device.

3. The system of claim 1, wherein the at least one hardware processor is further configured to:

generate a record instruction based on the control signal; and transmit the record instruction to a recording device; wherein the set of instructions contains information about overlaying the graphical content on recorded video content generated based on the record instruction.

4. The system of claim 1, wherein the at least one hardware processor is further configured to:

generate a playback instruction for playing on-demand content based on the control signal; and transmit the playback instruction to at least one of a tuner device and a recording device; wherein the set of instructions contains information about overlaying the graphical content on the on-demand content.

5. The system of claim 1, wherein the at least one hardware processor is further configured to:

generate a playback instruction for playing a recorded program based on the control signal; and transmit the playback instruction to at least one of a tuner device and a recording device; wherein the set of instructions contains information about overlaying the graphical content on the recorded program.

6. The system of claim 1, wherein the hardware processor is further configured to allocate an address to the display device, and wherein the tuning instruction, the graphical content, and the set of instructions are transmitted from the streaming media device to the display device via the HDMI connection using the allocated address.

7. A method for presenting media content using integrated content sources, comprising:

receiving, by a streaming media device, a control signal corresponding to a user input;

generating, by the streaming media device, at least one tuning instruction based on the control signal;

generating, by the streaming media device, graphical content;

transmitting, by the streaming media device, the tuning instruction to a display device via an HDMI connection, wherein the display device is to instruct a tuner external to the display device to generate video content based on the tuning instruction, and wherein the display device is to present the video content generated by the tuner and the graphical content;

generating, by the streaming media device, a set of instructions that instruct the display device to render the graphical content generated by the streaming media device as one or more graphical overlays on the video content generated by the tuner external to the display device based on the tuning instruction, wherein the set of instructions includes one or more coordinates that define an overlapping region in which both the video content and the graphical overlays are rendered and one or more parameters for modifying a transparency of the video content generated by the tuner; and transmitting the graphical content, including at least one geometric primitive that can be used to form vector graphics, and the set of instructions from the streaming media device to the display device via the HDMI connection, wherein the graphical content contains data usable to form the one or more graphical overlays at the one or more coordinates based on the set of instructions.

8. The method of claim 7, wherein the control signal is transmitted from a remote control associated with the system for controlling the display device.

9. The method of claim 7, further comprising:

generating a record instruction based on the control signal; and transmitting the record instruction to a recording device; wherein the set of instructions contains information about overlaying the graphical content on recorded video content generated based on the record instruction.

10. The method of claim 7, further comprising:

generating a playback instruction for playing on-demand content based on the control signal; and transmitting the playback instruction to one of a tuner device and a recording device, wherein the set of instructions contains information about overlaying the graphical content on the on-demand content.

11. The method of claim 7, further comprising:

generating a playback instruction for playing a recorded program based on the control signal; and transmitting the playback instruction to at least one of a tuner device and a recording device; wherein the set of instructions contains information about overlaying the graphical content on the recorded program.

12. The method of claim 7, further comprising allocating an address to the display device, wherein the tuning instruction, the graphical content, and the set of instructions are transmitted from the streaming media device to the display device via the HDMI connection using the allocated address.

13. A non-transitory computer-readable medium containing computer-executable instructions that, when executed by a processor, cause the processor to perform a method for presenting media content using integrated content sources, the method comprising:

receiving, by a streaming media device, a control signal corresponding to a user input;

generating, by the streaming media device, at least one tuning instruction based on the control signal;

generating, by the streaming media device, graphical content;

transmitting, by the streaming media device, the tuning instruction to a display device via an HDMI connection, wherein the display device is to instruct a tuner external to the display device to generate video content based on the tuning instruction, and wherein the display device is to present the video content generated by the tuner and the graphical content;

generating, by the streaming media device, a set of instructions that instruct the display device to render the graphical content generated by the streaming media device as one or more graphical overlays on the video content generated by the tuner external to the display device based on the tuning instruction, wherein the set of instructions includes one or more coordinates that define an overlapping region in which both the video content and the graphical overlays are rendered and one or more parameters for modifying a transparency of the video content generated by the tuner; and transmitting the graphical content, including at least one geometric primitive that can be used to form vector graphics, and the set of instructions from the streaming media device to the display device via the HDMI connection, wherein the graphical content contains data usable to form the one or more graphical overlays at the one or more coordinates based on the set of instructions.

14. The non-transitory computer-readable medium of claim 13, wherein the control signal is transmitted from a remote control associated with the system for controlling the display device.

15. The non-transitory computer-readable medium of claim 13, wherein the method further comprises:

generating a record instruction based on the control signal; and transmitting the record instruction to a recording device; wherein the set of instructions contains information about overlaying the graphical content on recorded video content generated based on the record instruction.

16. The non-transitory computer-readable medium of claim 13, wherein the method further comprises:

generating a playback instruction for playing on-demand content based on the control signal; and transmitting the playback instruction to one of a tuner device and a recording device, wherein the set of instructions contains information about overlaying the graphical content on the on-demand content.

17. The non-transitory computer-readable medium of claim 13, wherein the method further comprises:

generating a playback instruction for playing a recorded program based on the control signal; and transmitting the playback instruction to at least one of a tuner device and a recording device; wherein the set of instructions contains information about overlaying the graphical content on the recorded program.

18. The non-transitory computer-readable medium of claim 13, wherein the method further comprises allocating an address to the display device, wherein the tuning instruction, the graphical content, and the set of instructions are transmitted from the streaming media device to the display device via the HDMI connection using the allocated address.

* * * * *